United States Patent [19]

Shimokawa

[11] 4,270,184
[45] May 26, 1981

[54] MICROPROCESSOR-BASED PROGRAMMABLE LOGIC CONTROLLER

[75] Inventor: Yoshiyuki Shimokawa, Hachioji, Japan

[73] Assignee: Tokyo Shibaura Denki Kabushiki Kaisha, Tokyo, Japan

[21] Appl. No.: 887,060

[22] Filed: Mar. 16, 1978

[51] Int. Cl.³ .......................... G06F 9/22; G06F 13/00
[52] U.S. Cl. .................................................... 364/900
[58] Field of Search ... 364/900 MS File, 200 MS File, 364/104

[56] References Cited

U.S. PATENT DOCUMENTS

| | | | |
|---|---|---|---|
| 3,827,030 | 7/1974 | Seipp | 364/900 |
| 3,875,564 | 4/1975 | Thuruoka et al. | 364/900 |
| 4,078,259 | 3/1978 | Soulsby et al. | 364/900 |
| 4,092,730 | 5/1978 | Burkett et al. | 364/900 |
| 4,093,998 | 6/1978 | Miller | 364/900 |
| 4,107,785 | 8/1978 | Seipp | 364/900 |
| 4,118,792 | 10/1978 | Struger et al. | 364/900 |
| 4,138,718 | 2/1979 | Toke et al. | 364/900 |

OTHER PUBLICATIONS

Kompass, "Multiprocessor Concept Leads to PLC Hierarchies," in *Control Engineering*, Jan. 1976, pp. 46–47.

*Primary Examiner*—Melvin B. Chapnick
*Attorney, Agent, or Firm*—Stevens, Davis, Miller & Mosher

[57] ABSTRACT

A programmable logic controller with an input-output device for applying data indicating the status of external devices and controlling the devices. A main memory is provided for storing universal instructions and sequence instructions. An arithmetic operation control unit connected to the main memory repeatedly executes the universal and sequence instructions. A switch is provided for connecting the arithmetic operation control unit to a first read-only memory device for storing microinstructions used for executing universal instructions and to a second read-only memory device for storing microprograms used for executing sequence instructions. The switch provides arithmetic control over the sequence instructions microprogram and the universal instructions microprogram. The arithmetic operation control unit and a sequence control unit together execute sequence instructions in response from the microprogram instructions stored in the second read-only memory device.

4 Claims, 15 Drawing Figures

FIG. 2f

MICROPROCESSOR-BASED PROGRAMMABLE LOGIC CONTROLLER

BACKGROUND OF THE INVENTION

This invention relates to an improved programmable logic controller provided with a microprocessor.

Heretofore a programmable logic controller (PLC) has been fabricated with IC and MSI. More particularly, it has been constructed such that it can efficiently execute a sequence function among various functions of a minicomputer fabricated with IC and MSI, can reduce unnecessary functions and reduce the number of ICs and MSIs. As a result of recent developments in the art of electronics, there have been proposed microprocessors formed using large scale integration (LSI) techniques which have a higher reliability and provide many more functions. A microprocessor has functions comparable with those of a minicomputer but has a somewhat lower operating speed. Accordingly, if it were possible to incorporate a microprocessor into a PLC, it would be advantageous from the standpoint of price and reliability although some of the functions of the microprocessor are unnecessary.

However, since the microprocessor is constructed such that it can realize the functions of a minicomputer, if it were used as it is, it would be extremely difficult to efficiently execute a programmable logic sequence of instructions for the following reasons:

(1) Although logical AND and logical OR operations of word units can operate at high speeds, logical AND and logical OR operations of bit units require much longer operating times.

(2) It is impossible to efficiently store the results of a plurality of logical operations of a bit unit and utilize stored information.

(3) As is described in an article entitled "A 16-Bit LSI Minicomputer" in IEEE JOURNAL OF SOLID-STATE CIRCUITS, Vol. SC-11, No. 5, October 1976, in microprocessors, such as TOSBAC-40L, one word of an instruction word has 8 bits which are used for an operation code, and two sets of 4 bits which are respectively used for register designation and index designation. Even if an attempt is made to realize sequence instructions such as those shown in Table 2 of the present disclosure as one word, "A 1", for instance, has "A" which is an operation code and requires 8 bits as well as "1" which is an operand and requires more than 8 bits (256), cannot be done; that is, "A 1" cannot be accommodated in one word. Moreover, in ordinary instructions, the latter half (8 bits) of the initial instruction word (16 bits) is invariably used for register designation and index designation. Accordingly, if sequence instructions are added to a system of instruction words which an ordinary microcomputer has, two words will be necessary as in the above-mentioned article "A 16-Bit LSI Minicomputer". To reduce the occupied space of the memory, it is desired to compose sequence instructions of a single word.

SUMMARY OF THE INVENTION

Accordingly, it is an object of this invention to provide a novel PLC capable of processing instruction words from two sets of instructions, one being universal instructions and the other sequence instructions in the form of contactless symbols, and which can efficiently execute a sequence instruction made up of a single word.

According to this invention there is provided a programmable logic controller of the type comprising a main memory device for storing data and instruction words, an input/output device for exchanging data with external apparatus, a central processing unit including a group of general registers and a program status word for executing the stored instruction words and for controlling the main memory device and the input/output device, wherein the central processing unit further comprises a microprogrammable microprocessor, a first read only memory device for storing a microprogram utilized to execute universal instruction words and sequence instruction words, a second read only memory device for executing a sequence, a group of registers for executing the sequence, and an additional register for giving a condition to the second read only memory device.

"Universal instructions" as used herein means the basic instructions shown in the Table II of the above-mentioned article "A 16-Bit LSI Minicomputer", and means the usual instructions, such as load, store, fixed-point arithmetic, etc. which ordinary minicomputers and microcomputers have.

"A contactless symbol" means a symbol like the one shown in FIGS. 6C and 6D in U.S. Pat. No. 3,806,714, and can also be called a logic symbol. It is an alternative expression of a ladder diagram.

BRIEF DESCRIPTION OF THE DRAWING

In the accompanying drawings:

FIGS. 2a–2g is a diagram showing the detail of the hardware for executing a instruction sequence;

DESCRIPTION OF THE PREFERRED EMBODIMENTS

In describing the block diagram, it is assumed that a microprocessor Model TOSBAC-40L (hereinafter called "MP") manufactured by the assignee of this invention is used. This type of MP is called a microprogrammable microprocessor and needs to be combined with at least a read only memory for storing a microprogram to serve as a processor. Another example of this type of MP is designated as model LSI-11 of the Digital Equipment Corporation.

Figure 1:
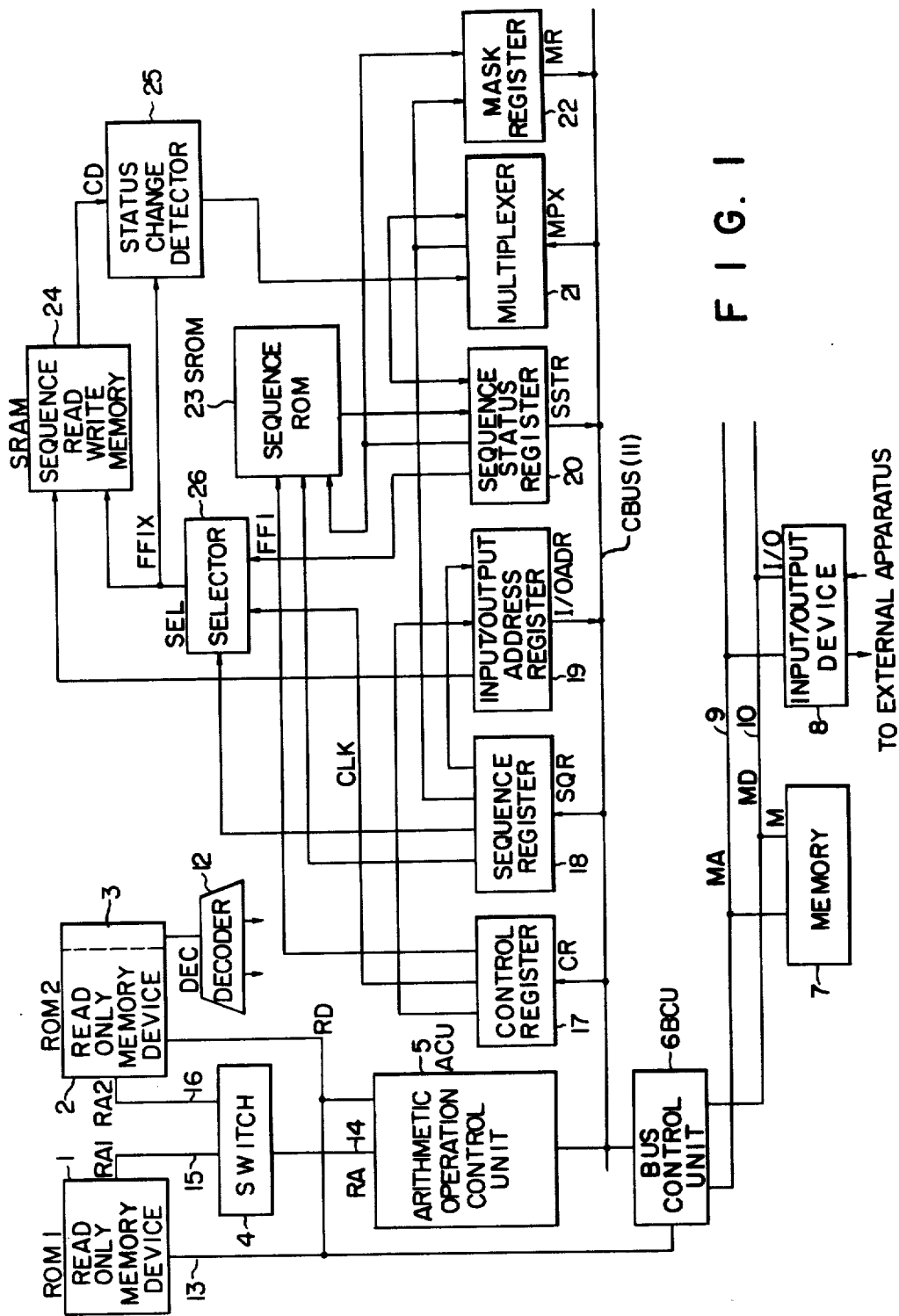
FIG. 1 is a block diagram showing the basic construction of the PLC embodying the invention.

When an ordinary microcomputer (rather than a programmable logic controller) is formed from such a microprocessor, read only memory devices ROM₂ (2,3), a switch SW (4), and decoders DEC 17 through 26 are eliminated from FIG. 1. Since an ordinary microcomputer is realized by a microprogrammable microprocessor it is then formed which includes a read only memory device ROM1 (1) which stores microprograms, an arithmetic operation control unit ACU(5) controlled by the microprogram to perform prescribed arithmetic and logical operations and control, a memory device M(7), an input/output device I/O(8) and a bus control unit BCU(6) which controls the memory device and the input/output device described above.

Description is now made with reference to the situation where an ordinary microcomputer (not having function of a programmable logic computer) is realized using a microprogrammable microprocessor. However, it is to be remembered that FIG. 1 shows a microcomputer having the additional functions of a programmable logic circuit.

The arithmetic operation control unit ACU (5) and the bus control unit BCU (6) are described in the above-mentioned article "A 16-Bit LSI Minicomputer". In this connection, it is noted here that for the purposes of subsequent discussion an LSI minicomputer is an alternative expression for a microcomputer.

All the logic circuits for arithmetic and sequence control functions, together with registers, are implemented in the ACU (5) circuit chips.

The bus control unit BCU (6) is 4 bit-sliced, and four BCU chips serve as the bus control unit. The BCU chips control the memory and I/O and also handle the interruptions.

Since switch SW(4) is eliminated in the ordinary microcomputer arrangement, the above identified component elements are interconnected by ROM address signal lines RA(14,15) for designating the address of the read only memory device ROM1, a ROM output data signal line RD(13) connected between the ROM and the ACU, a common data bus line CBUS(11) for interchanging signals between the arithmetic operation control unit ACU and the bus control unit BCU(5), a signal line MA(9) that designates the addresses of the memory device M and of the input/output unit I/O, and data read and write signal line MD(10) connected to the bus control unit BCU(6). The output data signal line RD(13) is also connected to the bus control unit BCU(6) to transmit microinstructions thereto. In this case, the input/output unit I/O(8) is also connected to the data read and write signal line MD(10), but it should be understood that the input/output unit I/O(8) may be connected to the other signal line extending from the bus control unit BCU(6). Although not shown in the drawing, there are also provided an interruption signal line and other signal lines.

As the read only memory device ROM 1 (1), a plurality of SIGNETICS 82 S 186 of Signetic Corporation may be employed. The functions of the SIGNETICS 82S186 are described in a data manual titled "Signetics Bipolar & MOS Memory" by Signetics Corporation. The SIGNETICS 82S186 has 4 BITS×1 KILOWORDS. The read only memory device ROM 1 (1) requires 12 BITS×2 KILOWORDS, and hence comprises six units of SIGNETICS 82S186.

A read only memory device ROM 2 (2), which will be described later, requires 16 BITS×2 KILOWORDS, and hence comprises eight units of SIGNETICS 82S186.

The read only memory device ROM 1 (1) receives an address signal designating the contents of the memory, the output signal of the read only memory device ROM 1 (1) and a control signal (not shown) for the read only memory device. The control signal is a selecting signal of the ROM chips, and is outputted from the switch SW (4), together with the address signal when the microprocessor is configured as a programmable logic computer as described below.

The input/output device I/O (8) may be a unit having the same fundamental functions as both the input unit (1) and the output unit (3) described in FIG. 2 of the U.S. Pat. No. 3,806,714 entitled "Sequence Controller" in which the present applicant is a co-inventor. The input/output device I/O (8) is connected to the MP and hence to the input/output unit I/O (8) by a data read and write signal line MD (10) and a signal line MA (9).

The memory device 7 has the same function as the memory device (2) in FIG. 2 of the above-mentioned U.S. Pat. No. 3,806,714 and stores the program as well as the results of arithmetic operations.

Figure 2A:
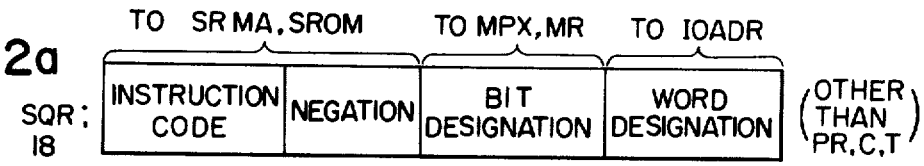
Figure 2B:
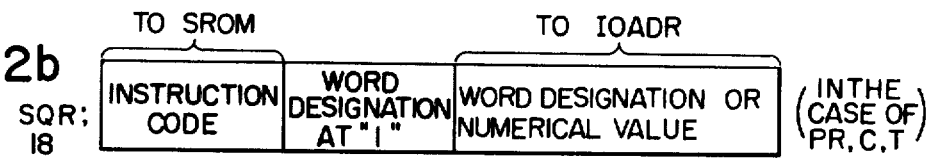

It is advantageous to construct a sequence instruction with one word in order to reduce the space of the memory device. For this reason, according to this invention the operation code is made up of one word consisting of 4 or 5 bits as shown in FIGS. 2a and 2b. But with this construction confusion might occur between the sequence instruction and the universal instruction utilized by the microprocessor. Accordingly, it is advantageous to provide two independent instruction systems, that is a universal instruction system and a sequence instruction system and to operate the switch SW(4) by transfer instructions respectively provided for the two instruction systems thereby selecting either one of the read only memory devices 1 and 2. The switch SW (4) connects the signal line (14) extending from the arithmetic operation control unit ACU (5) to both of the read only memory devices ROM 1 (1) and ROM 2 (2), and selects either of the read only memory devices. When the microprogram for the sequence instruction stored in the read only memory device 2 is efficiently prepared and when the speed of executing the instruction is fast there is no problem. However, as above described, the speed of the logical operation of the bit units is low and the usual microprocessor is not provided with any status flip-flop circuit for preserving the result of the logical operation for use later, for example at the time of interruption.

The logical operation of a bit is easier than that of the word units and since such operation can be made with hardware, the PLC of this invention is constructed such that:

(i) in addition to the microprocessor MP, there is provided a read only memory device ROM for, a holding circuit for holding necessary information, a register for designating the address of the input/output unit I/O(8), a circuit for designating a desired bit, a mask circuit for changing one bit of the status of the input/output unit I/O, a status register and so on, (ii) that most of the hardware is connected to the common data bus line CBUS(11), and the exchange of the data between the hardware and the common data bus line CBUS(11) and the logical operation of the sequence are controlled by a signal obtained by decoding by a decoder DEC(12) the information read out of a hardware controlling read only memory device ROM(3) which is added to the read only memory device ROM(2).

The decoder DEC (12) may be a decoder such as IC SN 74154 manufactured by Texas Instrument Corporation and produces outputs decoded in accordance with the contents of the ROM (3).

The arrangement outlined above will now be described in detail with reference to FIG. 1 and FIGS. 2a through 2e.

Among the circuits shown in FIGS. 2a through 2e, the sequence register SQR (18), and the control register (17) are registers which store the data received from the CBUS (11). Two flip-flops such as the well-known IC SN 74273 manufactured by Texas Instruments Corporation are used. The timing for the storing may be determined by the output of the DEC (12). 1D-8D of the SN 74273 are data inputs and iQ-8Q of the same are outputs and are used in each circuit.

The I/O ADR (19) and the SSTR (20) are registers for outputting the data stored in the CBUS (11). The output of the SN 74273 is connected to the CBUS (11) through a tristate buffer SN 74365 (manufactured by Texas Instrument Corp.).

The SSTR (20) is also adapted to receive data from the CBUS (11).

A: Sequence register SQR(18) . . . (FIGS. 2a and 2b)

The purpose of this sequence register is to store a sequence instruction in it and in the arithmetic operation control unit ACU(5) when it is fetched or read out and to use the sequence instruction for the logical operation. To perform a logical operation of a bit by a logical AND operation or a logical OR operation it is necessary to designate not only the word address of the input/output unit I/O but also a specific bit of the word. FIG. 2a shows this. Where a numerical value is processed as in a timer, bit designation is not necessary as shown in FIG. 2b.

FIGS. 2a and 2b also show the construction of the sequence instruction. FIG. 2a shows one example of an ordinary sequence instruction not including an arithmetic operation of the numerical value and comprising an operation code, a negation N, a bit designation and a word designation. "Negation" means that whether the state of the input/output unit designated by the bit designation and the word designation should be logically negated or not.

FIG. 2b shows one example of a sequence instruction including a logical operation of the numerical data and comprising an operation code, an R bit representing either a word designation or a numerical value, and a word designation or a numerical value.

As shown in FIGS. 2a and 2b, the output of the sequence register SQR (18) is fed to and used in the sequence read write memory device SRAM (24), the sequence read only memory device SROM (23), the multiplexer MPX (21), the mask register MR (22) and the input/output address register I/O ADR (19).

B: Control register CR(17) . . . (FIG. 2c)

Since the word designation of the sequence register SQR(18) is a relative address, it is necessary to designate the starting address of the input/output device(8) and such designation is made by this control register CR. At the time of the first scanning, which is made subsequent to the closure of the power source switch, different from ordinary scanning, the output is firstly initialized so that different sequence logical operation should be made. When the output of a simulate flip-flop circuit SIM (See FIG. 2c) is "1", the result of the sequence logical operation is not produced but maintained in the original state so that the usual sequence logical operation is not performed as usual. Thus, a POWER ON signal that becomes "1" at the time of the first scanning after power on (this signal is called PON) and the simulate flip-flop circuit SIM produce conditions for the sequence logical operation.

Figure 2C:
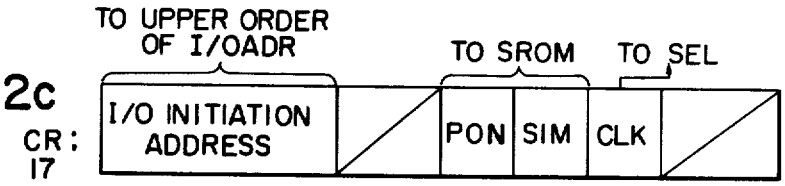

As shown in FIG. 2c, the output of the control register CR (17) is used in the input/output address register I/O ADR (19), the sequence read only memory device SROM (23) and the selector SEL (26).

Figure 2D:
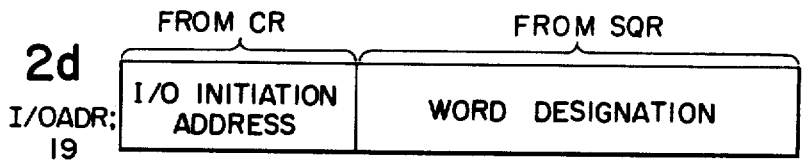

C: Input/output address register I/O ADR(19) . . . FIG. 2d

This register is used to designate the address of the input/output unit I/O(8) defined by the memory address area by utilizing the data supplied from the control register CR(17) and the sequence register SQR (18). Since the length of the data supplied from the sequence register SQR(18) differs depending upon the presence or absence of the bit designation as in a timer, the I/O address register 19 functions to perform two switchings. The switchings are accomplished by a logic circuit (not shown) besides the register in accordance with the instruction of the operation code from the control register CR (17).

The output of the input/output address register I/O ADR (19) is fed to the common data bus line CBUS (11).

Figure 2E:
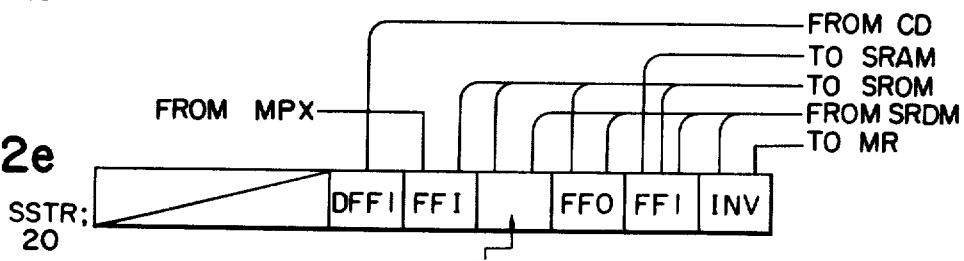

D: Sequence status register SSTR(20) . . . (FIG. 2e)

This register is used to hold an input required for the sequence logical operation and the result of an intermediate stage of the operation. Flip-flop circuits FFI, FSFF, FFO, FF1 (to be defined hereunder) correspond to the statuses [carry (C), overflow (V), greater (G) and lesser (L)] of the arithmetic operation control unit ACU(5), and if necessary the sequence status register holds these four bits together with one bit of the program status word representing the instruction system. For example, when an interruption occurs these four bits are held as the old program status words (OLD PSW) instead of statuses C, V, G and L. This makes it possible to immediately resume the sequence logical operation when the operation of interruption is finished. For example, in an ordinary computer, saving of the program status words at the time of interruption and loading of new program status words are automatically executed by hardware, and it is not necessary to execute the time-consumming loading by software.

The output of an inverter INV becomes "1" when the outputs of the flip-flop circuits FF1 and FFO are not equal, thus showing the reversal of the output status. The state of the output of the inverter INV is determined by performing a logical operation from the flip-flop circuits FF1 and FFO when the sequence status register SSTR (20) is loaded with a new value. Since the status of the counting pulse (FF1X) utilized at the time of the previous scanning is held in a sequence read write memory device SRAM (24), the output of the inverter becomes "1" when the sequence read write memory device SRAM(24) is at "0" state and the status of the counting pulse FF1X utilized to count is "1" that is at the build-up time of the pulse. Thus, different from the flip-flop circuits FFI, FSFF, FFO and FF1, signals "INV" and "DFF1" are not necessary to save at the time of interruption.

Various flip-flop circuits described above will now be described in detail.

Input flip-flop circuit FFI

This flip-flop circuit memorizes the designated bit status of the input/output unit I/O(8) which is supplied from a multiplexer MPX(21) to be described later.

First sequence flip-flop circuit FSFF

Output "1" of this flip-flop circuit which is produced by an instruction used at the end of the sequence as an OUTPUT instruction OUT means the first step of the sequence. In other words, this output is rendered to become "1" by the instruction utilized at the end of the instruction but "0" by other instructions thus identifying the start of the sequence. At the start of the sequence, different from the normal processing, no logical operation is performed by merely realizing the status by either logical product (AND) or logical sum (OR) operation.

Output flip-flop circuit (FFO)

This flip-flop circuit is used to hold the result of the arithmetic operation including that of the intermediate step thereof.

No.1 flip-flop circuit FF1

This is an auxiliary flip-flop circuit for temporarily holding the output of the output flip-flop circuit FFO. For example, this flip-flop circuit is used to store the result of the previous logical operations in the flip-flop circuit FFO.

E: Multiplexer MPX(21) ... (FIG. 2e)

The multiplexer selects one bit in accordance with the bit designation indicated by the SQR (18), among the input/output unit I/O of 16 bits (per word) supplied from the CBUS (11), and the selected bit is fed to the SSTR (20) as a signal to be inputted in the input/output flip-flop circuit FF1.

The multiplexer may comprise an IC such as SN 74150 of Texas Instrument Corp.

Figure 2G:
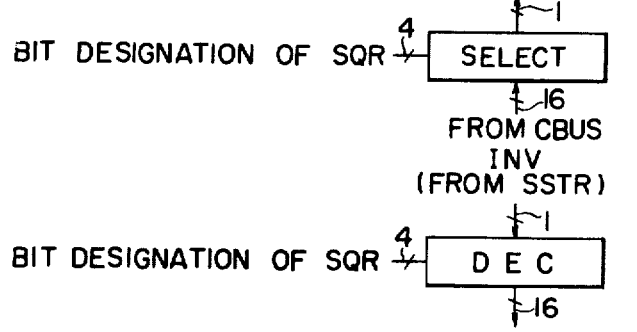

F: Mask register MR(22) ... (FIG. 2g)

When the output of the inverter INV is "1", that is when it is necessary to transfer the status of the designated bit of a designated word, this mask register produces a mask word which can be inverted by passing the original word status and this output "1" through an exclusive OR gate circuit. For example, the most significant bit MSB is inverted as follows:

| Mask word | 1000000000000000 |
|---|---|
| Original word | 0111000011110000 |
| New word | 1111000011110000 |

The mask word may be constructed so that a four bit portion of the bit designation of the SQR (18) is decoded into 16 bits when the INV of the SSTR (20) is "1", and when the INV of the SSTR (20) is "0" no decoding is carried out and the output of the 16 bits are all "0".

This may be realized by the use of a decoder, SN 74154 decoder of Texas Instrument Corp. and a bus driver, SN 74365 of Texas Instrument Corp. which gives the outputs of the CBUS (11).

G: Sequence read only memory device SROM(23)

The memory device constitutes one of the indispensable elements and can be executed during a short interval of one microstep of the sequence logical operation, whose principal function is to determine the four circuit elements of the first sequence flip-flop circuit FSFF, the output flip-flop circuit FFO, No. 1 flip-flop circuit FF1 and the inverter INV. The outputs of these circuit elements are functions utilizing the contents of an instruction code (including negation N), the first sequence flip-flop circuit FSFF, No. 1 flip-flop circuit FF1, the input/output flip-flop circuit FF1, the power on signal PON, and simulate flip-flop circuit SIM. Accordingly, the required logical operations are possible by designating the first sequence flip-flop circuit FSFF, the output flip-flop circuit FFO, the NO. 1 flip-flop circuit FF1 and the inverter INV for all combinations of the variables. In the sequence read only memory device SROM(23), the addresses thereof are utilized as these variables and the outputs read out therefrom are applied to the first sequence flip-flop circuit FSFF, the output flip-flop circuit FFO, the No. 1 flip-flop circuit FF1 and the inverter INV.

The content of the sequence read only memory circuit SROM(23) will now be described as follows:

Example of an AND instruction

In this example, the following logical operation is performed.

When the output of the first sequence flip-flop circuit FSFF is "0".

$$FFO \wedge ((FF1 \wedge \overline{N}) \vee (\overline{FF1} \wedge N)) \rightarrow FFO$$

When the output of FSFF is "1"

$$(FF1 \wedge \overline{N}) \vee (\overline{FF1} \wedge N) \rightarrow FFO$$

Based on these operations, the relationship between the variable (address) and the output of the read only memory device is shown in the following Table 1, in which symbol X shows that the output is "DON'T CARE". Actually, the outputs of the read only memory device are produced as the addresses thereof including an operation code.

TABLE 1

| ROM Variable (address) | | | | | | | ROM (output) | | | |
|---|---|---|---|---|---|---|---|---|---|---|
| N | FF1 | FSFF | FFO | FF1 | PON | SIM | FSFF | FFO | FF1 | INV |
| 0 | 0 | 0 | 0 | X | X | X | 0 | 0 | 0 | 0 |
| 0 | 1 | 0 | 0 | X | X | X | 0 | 0 | 0 | 0 |
| 0 | 0 | 0 | 1 | X | X | X | 0 | 0 | 0 | 0 |
| 0 | 1 | 0 | 1 | X | X | X | 0 | 1 | 0 | 0 |
| 1 | 0 | 0 | 0 | X | X | X | 0 | 0 | 0 | 0 |
| 1 | 1 | 0 | 0 | X | X | X | 0 | 0 | 0 | 0 |
| 1 | 0 | 0 | 1 | X | X | X | 0 | 1 | 0 | 0 |
| 1 | 1 | 0 | 1 | X | X | X | 0 | 0 | 0 | 0 |
| 0 | 0 | 1 | 0 | X | X | X | 0 | 0 | 0 | 0 |
| 0 | 1 | 1 | 0 | X | X | X | 0 | 1 | 0 | 0 |
| 0 | 0 | 1 | 1 | X | X | X | 0 | 0 | 0 | 0 |
| 0 | 1 | 1 | 1 | X | X | X | 0 | 1 | 0 | 0 |
| 1 | 0 | 1 | 0 | X | X | X | 0 | 1 | 0 | 0 |
| 1 | 1 | 1 | 0 | X | X | X | 0 | 0 | 0 | 0 |
| 1 | 0 | 1 | 1 | X | X | X | 0 | 1 | 0 | 0 |

TABLE 1-continued

| ROM Variable (address) | | | | | | ROM (output) | | | |
|---|---|---|---|---|---|---|---|---|---|
| N | FF1 | FSFF | FFO | FF1 | PON | SIM | FSFF | FFO | FF1 | INV |
| 1 | 1 | 1 | 1 | X | X | X | 0 | 0 | 0 | 0 |

Example of AND/OR instruction

Figure 3A:
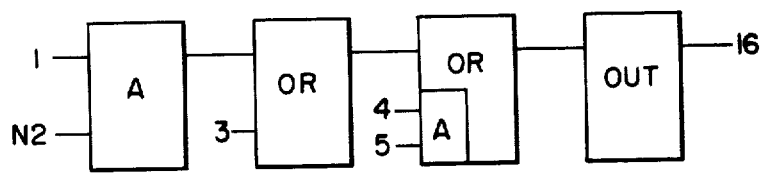
FIGS. 3a, 3b, and 3c are graphs showing typical examples of the sequence.
Figure 3B:
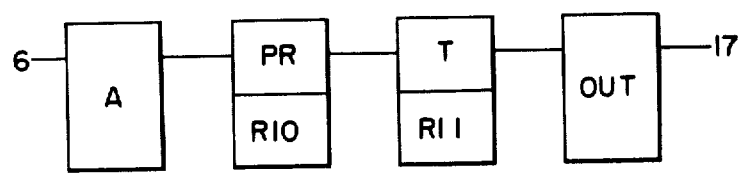
Figure 3C:
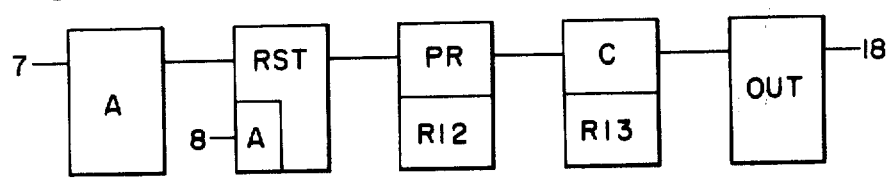
Figure 4A:
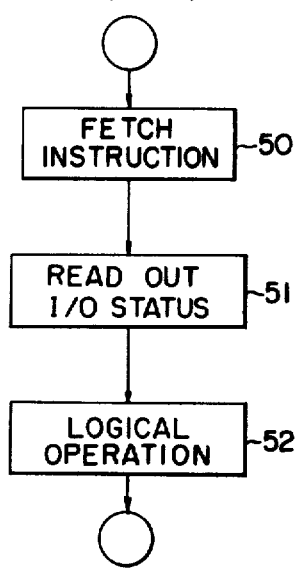
FIGS. 4a, 4b, 4c and 4d show flow charts for executing the sequences shown in FIGS. 3a, 3b and 3c.
Figure 4B:
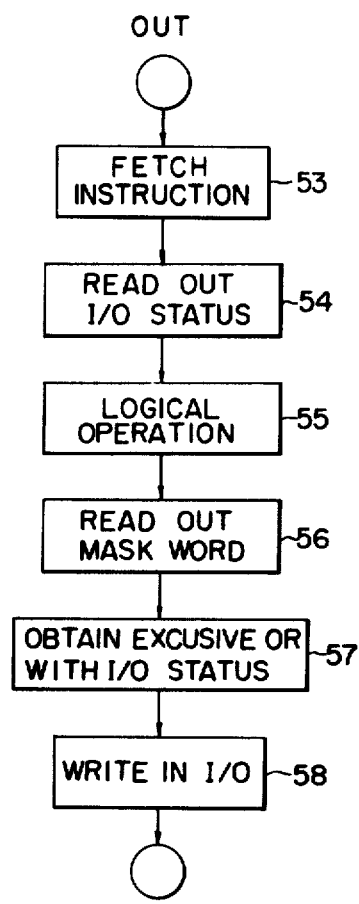
Figure 4C:
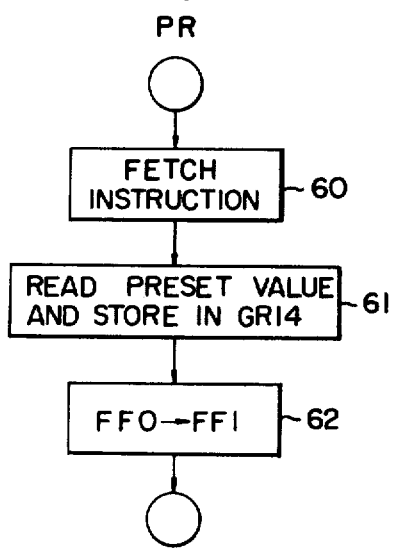
Figure 4D:
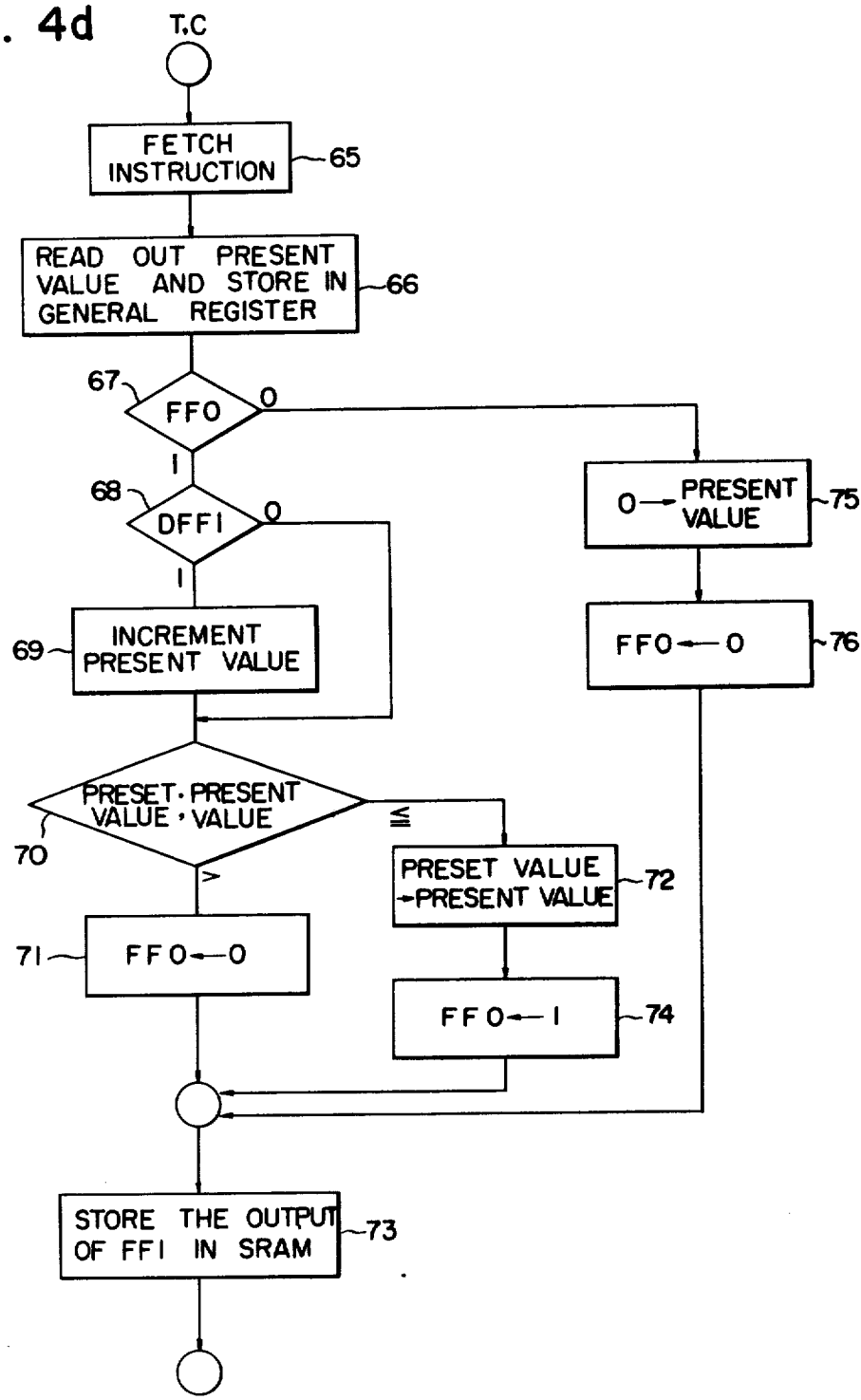

In this case a logical sum of a logical product and the data of the preceding stage are produced but the operations differ for a case when AND/OR operation is made for other instruction and for a case wherein the preceding operation also comprises AND/OR operation so that there are two types of the operation codes A/OR.S and A/OR. However, the sequence representations are the same as shown in FIGS. 3a, 3b and 3c. Table 2 below shows the content in the memory device in (7) in FIG. 1 of the sequence, whereas Table 3 explains the sequence instruction of the sequence shown in FIGS. 3a, 3b and 3c. The sequence shown in Table 2 is cyclically and repeatedly executed, and thereby operation of a sequence controller is performed.

TABLE 2

| Address | Content | |
|---|---|---|
| 1 | A | 1 |
| 2 | A | N2 |
| 3 | OR | 3 |
| 4 | A/OR . S | 4 |
| 5 | A/OR | 5 |
| 6 | OUT | 16 |
| 7 | A | 6 |
| 8 | PR | R10 |
| 9 | T | R11 |
| 10 | OUT | 17 |
| 11 | A | 7 |
| 12 | RST | 8 |
| 13 | PR | R12 |
| 14 | C | R13 |
| 15 | OUT | 18 |

TABLE 3

| | |
|---|---|
| A (AND) | logical product of all inputs |
| OR (OR) | logical sum of all inputs |
| A/OR (AND/OR) | logical sum of a logical product and the data of the preceding stage |
| OUT (OUTPUT) | output |
| A/OR.S (AND/OR) | same as A/OR but shows the first one of the blocks of A/OR |
| PR (PRESET) | setting of a timer, counter, etc. |
| T (TIMER) | present value of on-delay timer |
| RST (RESET) | reset counter when AND becomes TRUE, that is "1" |
| C (COUNTER) | present value of up-counters |

When A/OR.S
$$FF0 \to FF1$$
$$(FF1 \wedge \overline{N}) \vee (\overline{FF1} \wedge N) \to FF0$$
$$FF1 \vee (FF0 \wedge ((FF1 \wedge \overline{N}) \vee (\overline{FF1} \wedge N))) \to FF0$$

Logical operations of A/OR.S and A/OR may be realized by making a table similar to the Table 1 so that the above-mentioned logical expressions are realized and the ROM realizes the logical expressions.

Where the sequence read only memory device SROM (23) described above is used, there are the following advantages:

1. By using a high density LSI, it is possible to perform many logical operations of several tens of integrated circuits by only one or two read only memory devices. For example, when an instruction code (including N) comprises 5 bits, two read only memory devices each having a capacity of 1K(K=1024)×4 bits are provided since each variable comprises 11 bits.

2. All logical operations can be made at the same operating speed regardless of the complexity of the operation. The operating speed is high. For example, where a bipolar read only memory device is used, the access time is only 60-70 microseconds. Where an integrated circuit is used, the operating speed is determined by the decoding time of the instruction code. Furthermore, the number of integrated circuits used differs depending upon the logic so that the operation speed also differs. Accordingly, the operation speed is determined by a logic requiring a minimum operation speed.

3. Correction, change and addition of the logic can be made readily.

Where a programmable logic array PLA is used instead of a read only memory device, it is possible to eliminate unnecessary logics. For example, in the case of AND instruction (logical product) only 6 cases are necessary in which the output of the output flip-flop circuit FFO is "1" as indicated in Table 1 and it is only necessary to use logics of 6 AND conditions and logics of OR (logical sum) of these 6 AND conditions. Thus logics are eliminated as compared to a ROM with which an AND instruction requires 16 cases. Since a programmable logic array comprises a combination of read only memory devices for AND and OR, it can be realized with two types of read only memory devices.

H: Sequence read write memory device SRAM(24)

(Sequence RAM)

As above described, the purpose of the sequence read write memory device SRAM(24) is to memorize the present status of the counting pulse of counting devices such as counters and timers. The selector SEL(26) selects the No. 1 flip-flop circuit FF1 where a counter is used, whereas where a timer is used, the clock signal CLK of the control register CR(17) is selected and the selected signal is called FF1X. The FF1X signal is stored in the sequence read write memory device SRAM (24) at the necessary timing. The address to be stored is made to correspond to the word of the memory device M(7) in which the present value is stored. When up to 1024 timers or counters are used only one read write memory device having 1024 words×1 bit is sufficient.

The content of the sequence read write memory device SRAM(24) is applied to a status change detector CD(25) to perform an operation $\overline{SRAM \wedge FF1X}$ for detecting the build up of the next pulse by the result of an operation of SRAM∧FF1X that is DFF1. SRAM in the logical expression indicates the value stored at the time of the preceding scan. The status change detector CD (25) may be realized by a NAND gate such as SN 7400N of Texas Instrument Corp. When the output "1"

of this flip-flop circuit means a build up of a pulse the counter is counted up.

The hardware A through H described above is controlled by microinstructions prepared by decoding the data portion 3 of ROM 2. The microinstructions are as follows.

The data of CBUS (11) is stored in control register CR(17).

The data of CBUS(11) is stored in sequence register SQR(18).

The output of I/O ADR is given to the common data bus line CBUS(11).

The data of CBUS(3) is stored in sequence status register SSTR(20).

The output of SSTR(20) is given to the common bus line CBUS(13).

One of the content of CBUS (11) is selected by MPX(21) and stored in input flip-flop circuit FFI.

The output of MR(22) is given to common bus line CBUS (11). A logical operation of SROM is executed and the result is stored in 4 bits of the sequence status memory device SSTR(20). In the case of a counter or timer, store the output of No. 1 flip-flop circuit FI1X in the sequence read access memory device SRAM(24).

There are 8 types of control as above described. Of course, ordinary microinstructions of the arithmetic operation control unit ACU(5) are also provided at the same time.

Of the components described above, the decoder 12, the registers 17 through 19 and 22, the multiplexer 21, the sequence read only memory device 23, the sequence read write memory 24, the status change detector 25 and the selector 26 form a sequence control unit executing sequence instructions to produce signals indicating the desired status of the external devices to be controlled.

Having described the construction of the sequence controller of this invention, the operation thereof will now be described with reference to FIGS. 3a-3c and FIGS. 4a-4d. FIGS. 3a through 3c show sequences written in terms of a contactless symbol system. These sequences are stored in the memory device as shown in Table 2 and sequentially and cyclically and repeatedly executed. (1) through (8) in the content of the Table 2 are input devices and (16) through (18) are output devices which are part of the input/output device I/O (8). To make a distinction therebetween, each device is assigned a numeral. In the case shown in FIGS. 3a, 3b and 3c, logical product of input device 1 and the negation of input device 2 are obtained, the logical sum of the result of the preceding logical operation and the input device 3 is obtained, and the logical sum of the result and the logical product of input devices 4 and 5 is obtained and applied to output device 16 according to Table 3. When expressed by Boolean algebra, this operation is as follows:

(1∧2)∨3∨(4∧5)→16

FIG. 3b shows a case wherein T (timer) instruction is used. When input device 6 is "1", output device 17 produces an output "1" when the present value of word 11 becomes equal to a preset value in word 10.

FIG. 3c shows a case wherein C (counter) instruction is used. In this case, when the input device 8 is "1", each time input device 7 becomes "1", the counter counts up to store its present value in word 13. Word 12 is storing a preset value so that as the present value reaches the preset value the output device 18 becomes "1". When the input device 8 becomes "0", the counter is reset and both the present value and the output become "0".

The example of FIG. 3a will be described with reference to Table 2 and FIGS. 4a-4d.

A. From address 1 a sequence A 1 is fetched at step 50 and this sequence is stored in the arithmetic operation control unit ACU(5) and in the sequence register SQR(18). At step 51, a word represented by the input/output address register I/O ADR(19) is sent to bus control unit BCU(6) to read out the status of I/O(8). When number 1 of device 1 is divided by 16, a quotient of 0 and a surplus of 1 are obtained so that word 0 is read out. In this connection "word 0" means the number of words starting from an input/output initiation address. The first bit of the read out status is stored in the input flip-flop circuit FFI through multiplexer MPX(21). At step 52, a logical operation is performed by the sequence read only memory device 23 and the result of operation is stored in the sequence status register SSTR(20). In the same manner, addresses 2 through 5 are executed.

B. At step 53, a sequence "OUT 16" is fetched from address 53 and stored in the logical operation control unit 5 and the sequence register SQR(18). Like step 51, at step 54, the content of output device 16 is read out and stored in the input flip-flop circuit FFI. At step 55, the sequence read only memory device SROM(23) sets the first sequence flip-flop circuit FSFF and determines that whether the output device 16 should be inverted or not by the input flip-flop circuit FFI and the output flip-flop circuit FFO thereby performing the logical operation of the output of the inverter INV. The present state of the output device 16 is stored in the FF1. The state to be outputted to the output device 16 next is stored in the FF0. IF the FF1 and the FF0 are in different states, the INV is set. At step 56, a mask word is formed in mask register MR(22) in accordance with the output of the inverter INV, and this mask word is stored in the arithmetic operation control unit ACU(5). An exclusive OR of the mask word and word 1 read out at step 54 is obtained and at step 57 the result is applied to bus control unit BCU(6) to be written in word 1 at step 58.

The sequence using a timer instruction and shown in FIG. 3b will now be described.

C. At address 7, the same operation as "A" is performed.

D. At address 8, at first, content PR R10 is read out at step 60 and stored in the arithmetic operation control unit ACU(5) and the sequence register SQR(18). At step 61, a word represented by the input/output address register I/O ADR(19) is sent to the bus control unit BCU(6) for reading out the status of I/O(8). This corresponds to word 10 and preset value and stored in the 14th one of 16 general registers, not shown, of the arithmetic operation control unit ACU(5). At step 62 sequence read only memory device SROM(23) performs an arithmetic operation that saves the output of the output flip-flop circuit FFO in No. 1 flip-flop circuit FF1.

E. At step 65, an instruction is fetched from address 9 in the same manner as at step 60 and at step 66 a present value is read out instead of a preset value in the same manner as at step 61 and the read out value is stored in the 15th general register, not shown, of the arithmetical operation control unit ACU(5). Then, at step 67, the content of the sequence status register SSTR(20) is read out and put into the arithmetic operation control unit ACU(5) to judge whether the output of the output flip-flop circuit FFO is "1" or not (that is whether the timer is to be operated or not). If the output is "1", at step 68, whether the present value should be incremented or not is judged by DFF1. If the present value should be incremented the present value in the 15th general register is incremented at step 69, and at step 70 the content of the 14th general register is compared with the present value. If the present is larger than the preset value, the present value is made to be equal to the present value at step 72.

If the output of the output flip-flop circuit FFO is "0" after step 67, the output of the present value in the 15th general register is made to be "0" at step 75. At steps 71, 74, and 76, the arithmetic operation control unit ACU(5) writes data in the sequence status register SSTR(20) such that the output flip-flop circuit FFO would produce "1" or "0". The output of FFO is made "1" only at step 74. Thereafter, at step 73, the output of the first flip-flop circuit FF1 is stored in the sequence read write memory device SRAM(24).

F. Since the operation of address 10 is the same as that of item B, it will not be described. At the time of interruption, a status that shows whether the instruction system has been used is preserved in the program status word PSW and such sequence condition codes as FFI, FSFF, FFO and FF1 that are substituted for condition code CVGL of the universal instruction system are also preserved in the program status word PSW. More particularly, when an interruption is made during the execution of a sequence, a sequence condition code is preserved as PSW, and upon removal of the interruption, the PSW is returned to the sequence status register SSTR(20).

As above described, the programmable logical controller of this invention is characterized in that a microprogrammable microprocessor is used, that hardware for executing the sequence are added and controlled by the microinstruction, that in the hardware the sequence is executed at high speeds by a read only memory device, and that the hardware is provided with sequence condition codes. The addition of the hardware enables high speed execution of the sequence.

Most sequence instruction comprises a one bit operation and the added hardware efficiently executes the logical operation. Among the sequence instructions are included such instructions as a timer and a counter that process numerical values and they execute arithmetic operations in an existing arithmetic operation control unit ACU. In other words, the one bit logical operation and the arithmetic operation of a word (16 bits) are executed relatively by the added hardware and the ACU thus executing efficiently the sequence instruction as a whole. Moreover, it is not only possible to prepare a sequence instruction system which utilizes a lesser number of memory devices independent of the instruction system of the microprocessor but also to use both of the microinstructions to the hardware for executing the sequence and an ordinary microinstruction, thereby increasing the operating speed. Moreover an interruption can be made at any point during the execution of the sequence. Since the logical operation of the sequence is performed by a read only memory device not only the operation can be made at a high speed but also the addition and modification thereof are easy.

I claim:

1. A programmable logic controller comprising an input/output device for inputting data indicating the actual status of external devices and for outputting signals indicating the desired status of the external devices, a main memory device storing universal instructions and sequence instructions, an arithmetic operation control unit connected to said main memory device for repeatedly and sequentially fetching the universal instructions and the sequence instructions and executing the same, switch means connected to said arithmetic operation control unit for assuming a first state when a universal instruction is accessed by said arithmetic operation control unit and assuming a second state when a sequence instruction is accessed by said arithmetic operation control unit, a first read only memory device storing microprograms including microinstructions used for executing the universal instructions and connected to said arithmetic operation control unit through said switch means for receiving designated addresses from said arithmetic operation control unit when said switch means is in said first state, and producing microinstructions of the designated addresses for controlling said arithmetic control unit for execution of the universal instructions, a second read only memory device storing microprograms including microinstructions used for executing the sequence instructions, and connected to said arithmetic operation control unit through said switch means for receiving designated addresses from said arithmetic operation control unit when said switch means is in said second state, and a sequence control unit connected to said second read only memory device and used for executing the sequence instructions, said second read only memory device producing microinstructions of the designated addresses for controlling said arithmetic operation control unit and sequence control unit for execution of the sequence instructions, and said sequence control unit being controlled by said second read only memory drive to receive data indicating the status of the external devices obtained through said input/output device and to execute the sequence instructions to produce signals indicating the desired status of the external devices.

2. A programmable logic controller according to claim 1, wherein the sequence control unit comprises:

a register for storing data indicating the actual status of the external devices obtained through said input/output device, a sequence read only memory device connected to said register, and said second read only memory device for receiving, as an address, the data stored in said register and a microinstruction from said second read only memory device designating an executed logical operation stored in said sequence read only memory device, and producing the contents at the address which are the result of the logical operation, and a register for storing the result of the logical operation provided by said sequence read only memory device for further designating a logical operation of said sequence read only memory device or for output through said input/output device.

3. A programmable logic controller according to claim 1 or 2, wherein said arithmetic operation control unit includes a program status word register storing a signal indicating whether the universal instructions or the sequence instructions in said main memory device are accessed, and said switch means is responsive to said program status register to selectively assume said first or second state, said program status word register further storing, when an interrupt is made, the result obtained by execution of the sequence instruction.

4. A programmable logic controller according to claim 1, wherein said sequence control unit comprises:

a read write memory for storing the data indicating the status of a timing pulse of a predetermined frequency or the status of a count signal indicating the status of one of the external devices, said arithmetic operation control unit repeatedly reading the data indicating the status of the timing pulse or the count signal, a status change detector for detecting the rise-up of the timing pulse or the count signal based on the status thereof when the latest reading is carried out and the status thereof when the preceding reading was carried out, said main memory device storing a present value of a timer or counter which is incremented by one each time a rise-up is detected by said status change detector, and said arithmetic operation control unit comparing said present value with a preset value forming part of the sequence instruction to determine whether or not the present value is equal to the preset value, and for producing a signal when the present value is equal to the preset value, for use in deciding the desired status of one of the external devices.

* * * * *